United States Patent [19]
Lesher

[11] 3,907,798
[45] Sept. 23, 1975

[54] PREPARATION OF 4H-PYRIDO[1,2-A]PYRIMIDIN-4-ONES FROM CYCLIC ALKYLIDENE-2-PYRIDYL-AMINOMETHYLENEMALONATES

[75] Inventor: George Y. Lesher, Schodack, N.Y.

[73] Assignee: Sterling Drug Inc., New York, N.Y.

[22] Filed: Apr. 13, 1973

[21] Appl. No.: 350,948

Related U.S. Application Data

[60] Division of Ser. No. 82,170, Oct. 19, 1970, Pat. No. 3,798,227, which is a division of Ser. No. 735,566, June 10, 1968, Pat. No. 3,642,797, which is a continuation-in-part of Ser. No. 640,359, May 22, 1967, abandoned, which is a continuation-in-part of Ser. No. 464,850, June 17, 1965, abandoned.

[30] Foreign Application Priority Data
June 15, 1966 United Kingdom............ 26787/66

[52] U.S. Cl.... 260/256.4 F; 260/251 A; 260/256.5 R; 260/250 R; 260/250 A; 260/256.4 C; 260/283 R; 260/283 S; 260/283 SY; 260/287 R; 260/288 R; 260/288 P; 260/289 R; 260/293.85; 260/293.87; 260/293.88; 260/302 H; 260/308 D; 260/310 R; 260/340.2

[51] Int. Cl.$^2$............ C07D 471/04; C07D 487/04

[58] Field of Search .. 260/251 A, 256.4 F, 256.4 Q, 260/256.5 R

[56] References Cited
UNITED STATES PATENTS
3,149,112  9/1964  Allen .............................. 260/256.4
3,585,198  6/1971  Meszaros et al................... 260/251

OTHER PUBLICATIONS

Antaki et al., Chemical Abstracts, Vol. 45, 9061d, (1951).

*Primary Examiner*—Donald G. Daus
*Assistant Examiner*—Diana G. Rivers
*Attorney, Agent, or Firm*—Robert K. Bair; B. Woodrow Wyatt

[57] ABSTRACT

Alkylidene Ar-aminomethylenemalonates, where Ar is an aromatic radical having one or two aromatic rings which can be benzenoid or five- or six-membered heteroaromatic, are prepared by reacting the appropriate aromatic-amine with a mixture of a trialkyl orthoformate or trialkyl orthoacetate and an alkylidene malonate. The alkylidene Ar-aminomethylenemalonates are then cyclized by heating to provide an improved process for preparing various heterocyclic compounds, e.g., a 4-hydroxyquinoline from an alkylidene anilinomethylenemalonate, a 4H-pyrido[1,2-a]pyrimidin-4-one from an alkylidene 2-pyridylaminomethylenemalonate, a 4H-pyrimido[1,2-a]pyrimidine-4-one from an alkylidene 2-pyrimidylaminomethylenemalonate. The cyclized products are useful as intermediates for the preparation of antimalarials and anti-inflammatory agents.

3 Claims, No Drawings

PREPARATION OF 4H-PYRIDO·1,2-A/PYRIMIDIN-4-ONES FROM CYCLIC ALKYLIDENE 2-PYRIDYLAMINOMETHYLENEMALONATES

This application is a division of my copending application Ser. No. 82,170, filed Oct. 19, 1970 and now U.S. Pat. No. 3,798,227 issued Mar. 19, 1974, which in turn is a division of copending application Ser. No. 735,566, filed June 10, 1968 and now U.S. Pat. No. 3,642,797, issued Feb. 15, 1972, which in turn is a continuation-in-part of application Ser. No. 640,359, filed May 22, 1967 and now abandoned, which in turn is a continuation-in-part of application Ser. No. 464,850, filed June 17, 1965 and now abandoned.

This invention relates to aromatic amine derivatives, to a process for their preparation, to processes utilizing said derivatives as intermediates, and to certain products produced by said processes.

The invention sought to be patented, in one composition aspect, resides in the class of chemical compounds which I depict as having a molecular structure of the Formula I

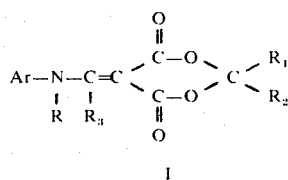

I where Ar is 1-2 ringed aryl, R is hydrogen or lower-alkyl, $R_1$ and $R_2$ are each lower-alkyl, and, $R_3$ is hydrogen or methyl.

The term "1-2 ringed aryl," as used throughout this specification, e.g., designated as Ar in Formula I, means aromatic radicals having one or two aromatic rings which can be benzenoid or five- or six-membered heteroaromatic, among which are, for purposes of illustration but without limiting the generality of the foregoing, phenyl, naphthyl, biphenylyl, pyridyl, pyrimidyl, pyrazinyl, pyridazinyl, thiazolyl, tetrazolyl, pyrazolyl, quinolyl and coumarinyl radicals. Preferred embodiments, because of their commercial practicability due to availability of intermediates and because of their use in a hereinbelow-described new process to prepare 4-hydroxyquinolines, are the compounds of Formula I where R is hydrogen and Ar is phenyl. Here and elsewhere throughout this specification, it will be understood that the benzene ring of phenyl can bear any kind and number of substituents such as would occur to the man skilled in organic chemistry, e.g., such substituents, solely for illustration and without limiting the generality of the foregoing, including lower-alkyl, lower-alkoxy, lower-alkylmercapto, lower-alkylsulfinyl, lower-alkylsulfonyl, halo, trihalomethyl, nitro, amino, lower-alkylamino, lower-alkanoylamino, benzyloxy, hydroxy, benzyl, and the like. When the benzene ring of phenyl is substituted, there are preferably from one to three substituents which can be in any of the available positions of the benzene ring, and where more than one substituent is present, they can be the same or different and they can be in any of the various position combinations relative to each other. The term "halo," as used here and throughout the specification, includes chloro, bromo, iodo and fluoro. The terms "lower-alkyl," "lower-alkoxy," "lower-alkylmercapto," "lower-alkylsulfinyl", "lower-alkylsulfonyl", "lower-alkylamino," "lower-alkanoylamino," and the like substituents, as used here and throughout the specification, have preferably from one to six carbon atoms which can be arranged as straight or branched chains, and, without limiting the generality of the foregoing, are illustrated by methyl, ethyl, n-propyl, isobutyl, n-hexyl, methoxy, isobutoxy, ethylmercapto, n-amylmercapto, ethyl-sulfinyl, isobutylsulfinyl, isopropylsulfonyl, n-butyl-sulfonyl, ethylamino, n-butylamino, acetylamino and propionylamino.

Other 1-2 ringed aryl radicals, e.g., naphthyl, biphenylyl, pyridyl, pyrimidyl, pyrazinyl, pyridazinyl, thiazolyl, tetrazolyl, pyrazolyl, coumarinyl and quinolyl radicals, also can bear at available ring-carbon positions substituents such as those illustrated above as substituents of the benzene ring.

The term "lower-alkyl," as used throughout this specification, e.g., as the meaning for each of $R_1$ and $R_2$ in Formula I, means alkyl radicals having from one to six carbon atoms inclusive, as illustrated by methyl, ethyl, n-propyl, isopropyl, 2-butyl, isobutyl, n-butyl, n-amyl, n-hexyl, and the like. Preferred embodiments, because of their cost advantage, are the compounds of Formula I where $R_1$ and $R_2$ are each methyl.

One process aspect of the invention resides in the preparation of the compounds of Formula I by reacting the appropriate aromatic-amine of the formula Ar-NHR with a mixture of a trialkyl orthoformate or trialkyl orthoacetate and an alkylidene malonate. This process is discussed hereinbelow and specifically illustrated as the first step of another process aspect of the invention, namely, the preparation of 4-hydroxyquinolines utilizing the compounds of Formula I where R is hydrogen and Ar is phenyl, as defined above.

4-Hydroxyquinolines are valuable intermediates. For example, they have been converted to corresponding 4-haloquinolines which, in turn, have been reacted with certain alkylenediamines to synthesize compounds having valuable chemotherapeutic properties, e.g., reaction of 4,7-dichloroquinoline with 5-diethylamino-2-pentylamine yields 7-chloro-4-(5-diethylamino-2-pentylamino)quinoline, an antimalarial agent known as chloroquine.

Heretofore, the preferred method of preparing 4-hydroxyquinolines has been the four-step Gould-Jacobs' synthesis illustrated as follows using aniline (II) as an intermediate:

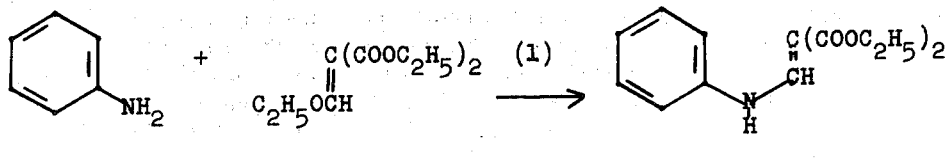

II            III            IV

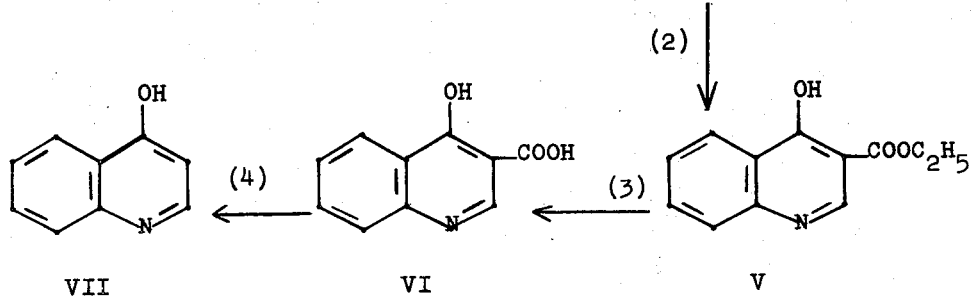

Thus, in step (1), aniline (II) is reacted with diethyl ethoxymethylenemalonate (III) to form diethyl anilinomethylenemalonate (IV), which is cyclized by heating the step (2) to form ethyl 4-hydroxyquinoline-3-carboxylate (V). In step (3), the ester (V) is hydrolyzed to the acid (VI) which is then decarboxylated in step (4) to produce 4-hydroxyquinoline (VII).

In contrast to the above four-step procedure, the process of my invention resides in only two steps, which are illustrated below using aniline (II) as an intermediate. As seen in the following illustration, no ester and no acid corresponding respectively to V and VI above are formed in my process.

with stirring, a mixture of the three reactants, preferred reactants being triethyl orthoformate (VIII, $R_3 = H$ and $R' = C_2H_5$) and isopropylidene malonate (IX, $R_1 = R_2 = CH_3$). The reaction also can be run by stirring the reactants at room temperature although the reaction may take longer or, also, it can be run at temperatures higher than 100°C., although to no particular advantage. Many of the illustrative examples hereinbelow were carried out in the presence of a small quantity of p-toluenesulfonic acid since it was first thought that the reaction was acid catalyzed, but it was later found out that the condensation could be effected in the absence of an acid, in fact, even in the presence of excess so-

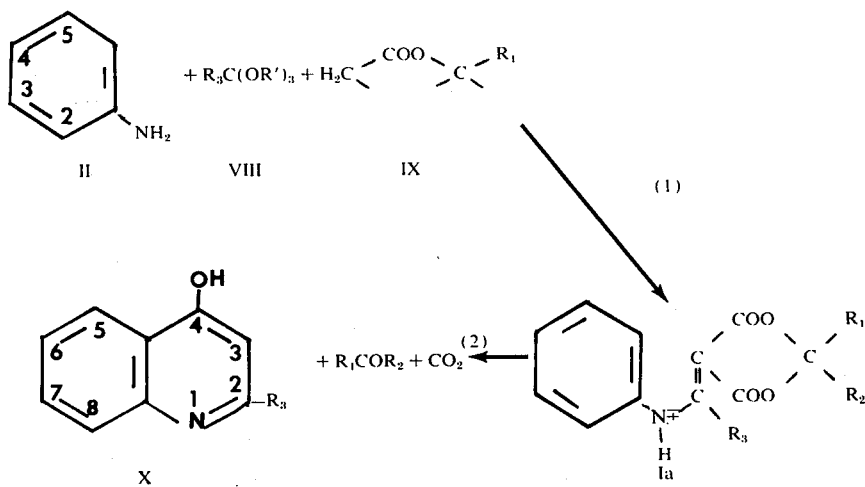

where $R_3$ is hydrogen or methyl, and, $R'$, $R_1$ and $R_2$ are each lower-alkyl. The aniline used in my process is unsubstituted in at least one of benzene ring positions ortho to the amino group. Optionally, the aniline can be substituted by from one to four of a variety of substituents at positions 2, 3, 4 or 5 of the benzene ring thereby resulting in 4-hydroxyquinolines similarly substituted at positions 8, 7, 6 or 5, respectively; unsymmetrical anilines, e.g., those monosubstituted in the meta- or 3-position and having no substituents at either the 2- or 6-position, yield a mixture of isomeric 4-hydroxyquinolines (X), e.g., use of 3-chloroaniline results in a mixture of 5-chloro-4-hydroxyquinoline and 7-chloro-4-hydroxyquinoline which can be separated by known means.

In step (1) of my two-step process, an aniline (e.g., II) is reacted with a mixture of a trialkyl orthoformate (VIII, $R_3 = H$) or orthoacetate (VIII, $R_3 = CH_3$) and an alkylidene malonate (IX) to yield an alkylidene anilinomethylenemalonate (e.g., Ia) which, in step (2), is heated to form the 4-hydroxyquinoline (e.g., X) and a ketone, $R_1COR_2$, and carbon dioxide. Step (1) is preferably carried out by warming to about 50°–100°C., dium acetate. Actually, the reaction is preferably run with no condensing agent. Yields are very good, ranging from about 70 to 95 percent. Step (2) of my process, i.e., the ring closure of the alkylidene anilinomethylenemalonate (e.g., Ia) to form the 4-hydroxyquinoline (e.g., X), was carried out by heating the isopropylidene anilinomethylenemalonate in an inert solvent at about 200° to 300°C., preferably at about 225°–275°C. Found particularly useful was a refluxing eutectic mixture of diphenyl and diphenyl ether (Dowtherm A). Other solvents that can be used are mineral oil, dibenzyl ether, diethyl phthalate, nitrobenzene, and the like. Optionally, the reaction can be run by heating as above in the absence of a solvent. Yields of this step usually range from about 50 to 100 percent.

Alternatively, the above two steps of my process have been run consecutively without isolation of compound Ia, the yields being comparable with those obtained by isolating said intermediate.

Another variation of my process is the one-step reaction of the reactants of step (1) above using the reaction conditions of step (2) to form the 4-hydroxyquinolines. This variation, which also affords a way of preparing 4-hydroxyquinolines optionally bearing a 3-(lower-alkyl) substituent ($R_4$), is illustrated as follows using aniline (II):

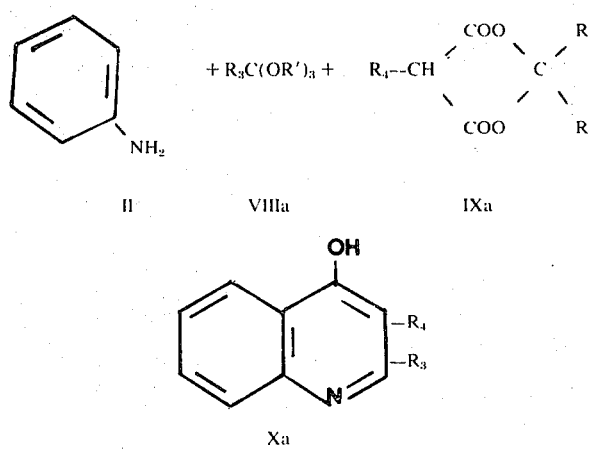

where $R_3$ is hydrogen or methyl, $R_4$ is hydrogen or lower-alkyl, and R', $R_1$ and $R_2$ are each lower-alkyl. As above, the aniline used in the process is unsubstituted in at least one of the benzene ring positions ortho to the amino group and, optionally, can be substituted as noted hereinabove. In the above one-step synthesis, a mixture of an aniline (e.g., II), a trialkyl orthoformate (VIIIa, $R_3$ = H) or orthoacetate (VIIIa, $R_3$ = $CH_3$), and an alkylidene(lower-alkyl)-malonate (IXa) is heated as in step (2) above to form the 4-hydroxyquinoline (e.g., Xa) and a ketone, $R_1COR_2$ and carbon dioxide.

In the above step (1) of my process, when another lower-aromatic amine (Ar-$NH_2$) is substituted for an aniline, the corresponding alkylidene (lower-aromatic)-aminomethylenemalonate of Formula I is obtained. When such a compound is treated as in step (2), ring closure is effected to produce a product containing a newly formed six-atom aromatic ring containing hydroxyl or oxo substituted in the position para to the ring-nitrogen atom. Thus, by heating a compound of Formula I where R is hydrogen, $R_1$ and $R_2$ are each lower-alkyl, $R_3$ is hydrogen or methyl, and Ar is 1-2 ringed aryl which has a substitutable ring-carbon atom ortho to its ring-carbon connected to the nitrogen atom of the aminomethylenemalonate moiety, there is formed a (4-hydroxy-2-$R_3$-5,6-pyrido)-Ar compound; or, by heating a compound of Formula I where R is hydrogen, $R_1$ and $R_2$ are each lower-alkyl, $R_3$ is hydrogen or methyl, and Ar is 1-2 ringed aryl which has a ring-nitrogen atom adjacent to its ring-carbon connected to the nitrogen atom of the aminomethylenemalonate moiety, ring closure is effected at the ring-nitrogen atom to form a (4-oxo-6-$R_3$-2,3-pyrimido)-Ar compound. These ring closures thus are other process aspects of my invention and, without limiting the generality of the foregoing, are illustrated as follows: heating an alkylidene naphthylaminomethylenemalonate to form a 4-hydroxybenzoquinoline; heating an alkylidene 2-pyridylaminomethylenemalonate to form a 4H-pyrido[1,2-a]pyrimidin-4-one; heating an alkylidene 2-substituted-3-pyridylaminomethylenemalonate to form a 4-hydroxy-8-substituted-1,7-naphthyridine; heating an alkylidene 2-unsubstituted-3-pyridylaminomethylenemalonate to form a 4-hydroxy-1,5-naphthyridine; heating an alkylidene 2-pyrimidylaminomethylenemalonate to form a 4H-pyrimido[1,2-a]pyrimidin-4-one; heating an alkylidene 5-uracilylaminomethylenemalonate to form a 1,5-dihydro-3H-pyrido[3,2-d]pyrimidine-2,4,8-trione; heating an alkylidene 2-pyrazinylaminomethylenemalonate to form a 4H-pyrazino[1,2-a]pyrimidin-4-one; heating an alkylidene 3-pyridazinylaminomethylenemalonate to form a 4H-pyrimido[1,2-b]pyridazin-4-one; heating an alkylidene 2-thiazolylaminomethylenemalonate to form a pyrimido-[2,1-b]thiazole; heating an alkylidene 5-(1H-tetrazolyl)aminomethylenemalonate to form a 7-hydroxytetrazolo[1,5-a]pyrimidine; heating an alkylidene 2-phenyl(or lower-alkyl)-3-pyrazolylaminomethylenemalonate to form a 1-phenyl(or lower-alkyl)-1H-pyrazolo[3,4-b]pyridine; heating an alkylidene 2-quinolylaminomethylenemalonate to form a 1H-pyrimido[1,2-a]quinolin-1-one; heating an alkylidene 3-quinolylaminomethylenemalonate to form a benzo[f-][1,7]naphthyridin-1-ol; heating an alkylidene 5-quinolylaminomethylenemalonate to form a 1,7-phenanthrolin-4-ol; heating an alkylidene 6-quinolylaminomethylenemalonate to form a 4,7-phenanthrolin-1-ol; heating an alkylidene 7-quinolylaminomethylenemalonate to form a 1,7-phenanthrolin-10-ol; heating an alkylidene 8-quinolylaminomethylenemalonate to form a 1,10-phenanthrolin-4-ol; and, heating an alkylidene 6-coumarinylaminomethylenemalonate to form a 10-hydroxy-3-oxo-3H-pyrano[3,2-f]quinoline.

The (4-hydroxy-2-$R_3$-5,6-pyrido)-Ar and (4-oxo-6-$R_3$-2,3-pyrimido)-Ar products of my process are useful, for example, the former are useful as intermediates in the preparation of antimalarial agents, as illustrated above for the 4-hydroxyquinolines, and the latter have anti-inflammatory activity, as illustrated below for the 4H-pyrido[1,2-a]-pyrimidin-4-ones.

It will be noticed that Ar in Formula I includes substituents which by their location may inhibit or even prevent the cyclization process to form the (4-hydroxy-2-$R_3$-5,6-pyrido)-Ar or (4-oxo-6-$R_3$-2,3-pyrimido)-Ar compound, e.g., the failure to cyclize isopropylidene 2,6-dimethylanilinomethylenemalonate (by the blocking action of the 2- and 6-methyl substituents). Nevertheless, such compounds as these are useful in establishing the limits of the cyclization reaction.

Also, it will be noticed that the compounds of Formula I where R is lower-alkyl do not undergo cyclization, e.g., the failure to cyclize isopropylidene N-methylanilinomethylenemalonate (by the apparent blocking action of the N-methyl substituent). Such compounds are, nevertheless, useful in establishing the limits of the cyclization reaction. Further, these N-(lower-alkyl) compounds have been tested by standard pharmacological evaluation procedures and found to be useful in having biological activity, e.g., psychomotor depressant properties, barbiturate-potentiating activity, as illustrated further hereinbelow.

Another composition aspect of my invention sought to be patented is described as residing in the class of chemical compounds which I designate 4H-pyrido[1,2-a]pyrimidin-4-ones of the Formula XI

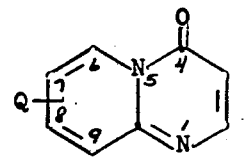

XI where Q represents from one to three substituents at positions 6, 7, 8 or 9 of the pyridopyrimidine nucleus selected from the group consisting of lower-alkyl, hydroxy, lower-alkanoylamino, lower-alkylamino, benzyl, lower-alkoxy, lower-alkylmercapto, lower-alkylsulfinyl, lower-alkylsulfonyl and trihalomethyl. These embodiments of my invention are useful because of their anti-inflammatory properties as established by known pharmacological test procedures, e.g., inhibition of carrageenin-induced local foot edema in fasted rats. For example, when tested by the above-noted procedure, these compounds when administered orally at dose levels in the range of 25 to 200 mg./kg. were found to afford greater than 30 percent inhibition of edema, thereby evidencing their anti-inflammatory activity. In contrast, the corresponding unsubstituted compound, i.e., Formula XI where Q is hydrogen, when tested by the same procedure, produced insignificant inhibition at 200 mg./kg.

The compounds of Formula XI were prepared by my above-described process, that is, by heating a Q-2-pyridylaminomethylenemalonate (Ib) to form a Q-4H-pyrido-[1,2-a]pyrimidin-4-one (XI), illustrated structurally as follows:

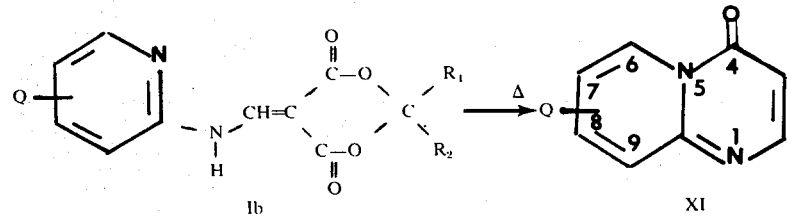

The compounds of Formula XI are useful both in free base form and in acid-addition salt form and both forms are within the purview of the invention, and are considered to be one and the same invention. The acid-addition salts are simply a usually more convenient form for use; and, in practice, use of the salt form inherently amounts to use of the base form. The acids which can be used to prepare the acid-addition salts are preferably those which produce, when combined with the free base, pharmacodynamically acceptable salts, that is, salts whose anions are relatively innocuous to the animal organism in pharmacodynamic doses of the salts, so that the beneficial properties inherent in the free base are not vitiated by side effects ascribable to the anions; in other words, the latter do not substantially affect the pharmacodynamic properties inherent in the cations. Appropriate pharmacodynamically acceptable salts within the scope of the invention are those derived from mineral acids such as hydrochloric acid, hydrobromic acid, hydriodic acid, nitric acid, phosphoric acid, sulfamic acid, and sulfuric acid; and, organic acids such as acetic acid, citric acid, tartaric acid, lactic acid, methanesulfonic acid, ethanesulfonic acid, quinic acid, and the like, giving the hydrochloride, hydrobromide, hydriodide, nitrate, phosphate, sulfamate, sulfate, acetate, citrate, tartrate, lactate, methanesulfonate, ethanesulfonate and quinate, respectively.

The acid-addition salts are prepared preferably by reacting the free base and acid in an organic solvent, e.g., ethanol, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed for purposes of purification or identification, or when it is used as an intermediate in preparing a pharmacodynamically acceptable salt by ion exchange procedures.

Also encompassed by my invention are quaternary ammonium salts of the aforesaid 4H-pyrido[1,2-a]pyrimidin-4-ones of the Formula XI, quaternization occurring at the 1-ring nitrogen. These salts are also useful because of their anti-inflammatory properties and are useful for further identification of said 4H-pyrido[1,2-a]-pyrimidin-4-ones. The quaternary ammonium salts are obtained by the addition of esters having a molecular weight less than about 200 to the free base form of the compounds. A preferred class of esters comprises lower-alkyl, lower alkenyl or benzyl esters of inorganic acids or organic sulfonic acids of the formula $R_5$-An where $R_5$ is lower-alkyl, lower-alkenyl (having 3 to 6 carbon atoms) or benzyl and An is an anion of a strong inorganic acid or an organic sulfonic acid, e.g., chloride, bromide, iodide, sulfate, methanesulfonate, benzenesulfonate, para-toluenesulfonate, and the like. $R_5$ when benzyl can bear any number and kind of inert substituents in the benzene ring, such substituents being illustrated by, but not limited to, lower-alkyl, lower-alkoxy, halo, nitro, lower-alkylamino, lower-alkylmercapto, and the like. $R_5$-An is thus illustrated by, but not limited to, methyl chloride, methyl bromide, methyl iodide, ethyl bromide, propyl chloride, isobutyl bromide, allyl chloride, allyl bromide, methyl sulfate, methyl methanesulfonate, methyl benzenesulfonate, methyl p-toluenesulfonate, benzyl chloride, benzyl bromide, p-chlorobenzyl chloride, p-nitrobenzyl chloride, o-chlorobenzyl chloride, 3,4-dichlorobenzyl chloride, p-methoxybenzyl chloride, and the like. The quaternary ammonium salts are prepared by mixing the free base and the alkyl, alkenyl or benzyl esters in an organic solvent inert under the conditions of reaction, for example, ethanol, methanol, ether, acetonitrile, dimethylformamide, dimethyl sulfoxide, and the like or, alternatively, in the absence of a solvent. Heating is preferably used to facilitate the reaction, although quaternary formation takes place at room temperature but a longer reaction time is needed. The quaternary ammonium salt separates directly or can be obtained by concentration of the solution.

Also encompassed by my invention are the 1-oxide derivatives of the alkylidene pyridylaminomethylenemalonates of Formula Ib. These compounds, which are prepared by the first step of my above-described process by reacting a 2-aminopyridine-N-oxide with a tri-(lower-alkyl) orthoformate and an alkylidene malonate, are useful as characterizing derivatives of the compounds of Formula Ib.

Other aspects encompassed by my invention are: the bis-analogs of the compounds of Formula I, i.e., the compounds of the Formula XII

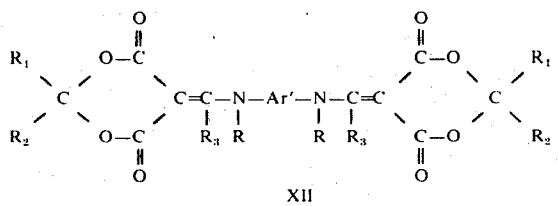

XII where Ar' is phenylene or as defined hereinbelow (i.e., A''-Z-Ar'') and, R, $R_1$, $R_2$ and $R_3$ are each defined as above for Formula I; the process of preparing the bis compounds of Formula XII which is carried out the same as the hereinabove-described process of preparing the compounds of Formula I but using an arylenediamine of the formula $H_2N$-Ar'-$NH_2$ and at least two molar equivalents of the other reactants, i.e., a mixture of a trialkyl orthoformate or trialkyl orthoacetate and an alkylidene malonate; and, the process of heating a compound of Formula XII as described hereinabove (for the process of heating a compound of Formula I) to form the corresponding bis(4-hydroxy-2-$R_3$-5,6-pyrido)=Ar' compound when Ar' is phenylene which is unsubstituted at ring-carbon positions ortho to its ring-carbons connected to the nitrogen atoms of the aminomethylenemalonate moieties. Other bis-aspects of my invention are like the above where —Ar'— is replaced by —Ar''—Z—Ar''- where Ar'' is phenylene and Z is a direct linkage, O, S, S-S, NH, N(lower-alkyl), C(=O) or lower-alkylene. Here and elsewhere throughout this specification, it will be understood that the benzene ring of phenylene, designated above as Ar' and Ar'', can bear any kind and number of substituents such as would occur to the man skilled in organic chemistry, e.g., such substituents being the same as those illustrated above for the benzene ring of phenyl.

The molecular structures of the compounds of my invention are established by their mode of synthesis and corroborated by the correspondence of calculated and found values for the elementary analyses and by infrared (IR) spectral analyses.

The following examples will further illustrate the invention without, however, limiting it thereto.

EXAMPLE 1

A. Isopropylidene 2-pyridylaminomethylenemalonate — A mixture containing 9.4 g. of 2-aminopyridine, 14.8 g. of triethyl orthoformate and 15.8 g. of isopropylidene malonate was heated on a steam bath with stirring for about twenty minutes and cooled to room temperature. The solid was collected and recrystallized from a large quantity of absolute ethanol using decolorizing charcoal to yield 18.9 g. (76 percent) of isopropylidene 2-pyridylaminomethylenemalonate, m.p. 175.2°–176.4°C. (corr.).

Anal. Calcd. for $C_{12}H_{12}N_2O_4$: C, 58.05; H, 4.88; N, 11.29. Found: C, 58.07; H, 5.03; N, 11.20.

B. 4H-pyrido[1,2-a]pyrimidin-4-one — A suspension containing 1.0 g. of isopropylidene 2-pyridylaminomethylenemalonate in 3 ml. of mineral oil was heated with stirring over a free flame. Considerable bubbling occurred between 180°–240°C. and then subsided. The liquid portion of the reaction mixture was decanted into a clean test tube and diluted with n-pentane. The solid that separated was collected and recrystallized from isopropyl ether to yield 4H-pyrido[1,2-a]pyrimidin-4-one, m.p. 130°–131°C.

Anal. Calcd. for $C_8H_6N_2O$: C, 65.74; H, 4.14; N, 19.17. Found: C, 65.52; H, 3.90; N, 18.90.

This compound has been prepared by a different method by Adams and Pachter, J. Am. Chem. Soc. 74, 5491 (1952).

C. 4H-pyrido[1,2-a]pyrimidin-4-one was also prepared following the procedure described hereinbelow in Example 4B using 11.9 g. of isopropylidene 2-pyridylaminomethylenemalonate and 119 ml. of Dowtherm A. After one recrystallization from isopropyl ether and drying overnight in a vacuum oven at 80°C., there was thus obtained 4.1 g. (59 percent) of the product, m.p. 128.0°–129°C. (corr.).

Anal. Calcd. for $C_8H_6N_2O$: C, 65.75; H, 4.14; N, 19.17. Found: C, 65.52; H, 4.33; N, 18.95.

EXAMPLE 2

A. Isopropylidene 6-methyl-2-pyridylaminomethylenemalonate — A mixture of 10.8 g of 2-amino-6-methylpyridine, 14.8 g. of ethyl orthoformate, 15.8 g. of isopropylidene malonate and 1.0 g. of p-toluenesulfonic acid monohydrate was stirred at room temperature for four hours with no apparent reaction. The mixture was then heated on a steam bath with stirring and the ethanol formed by the reaction removed by distillation. Heating was continued for an additional ten minutes whereupon the reaction mixture crystallized. The crystalline material was recrystallized twice from absolute ethanol to yield 11.4 g. (45 percent) of isopropylidene 6-methyl-2-pyridylaminomethylenemalonate, m.p. 155.2°–160.0°C. (corr.).

Anal. Calcd. for $C_{13}H_{14}N_2O_4$: C, 59.53; H, 5.38; N, 10.68. Found: C, 59.76; H, 5.47; N, 11.00.

B. 6-Methyl-4H-pyrido[1,2-a]pyrimidin-4-one — A suspension of 10 g. of isopropylidene 6-methyl-2-pyridylaminomethylenemalonate in 100 ml. of mineral oil was heated with stirring. At 160°C. a clear red solution was obtained; after four minutes the temperature had reached 206°C. and bubbles began to form; after an additional 6 minutes bubbling had stopped (temperature of 245°C.) and the solution was quite dark. The hot reaction mixture was decanted into a clean flask and cooled with stirring, followed by chilling in an ice bath. The resulting precipitate was collected, washed with n-pentane and recrystallized from cyclohexane using decolorizing charcoal to yield 1.7 g. of 6-methyl-4H-pyrido[1,2-a]pyrimidin-4-one, m.p. 118.0°–119.0°C. (corr.).

Anal. Calcd. for $C_9H_8N_2O$: C, 67.49; H, 5.03; N, 17.49. Found: C, 67.71; H, 5.15; N, 17.23.

EXAMPLE 3

A. Isopropylidene 3-methyl-2-pyridylaminomethylenemalonate — A mixture containing 10.8 g. of 2-amino-3-methylpyridine, 14.8 g. of triethyl orthoformate and 15.8 g. of isopropylidene malonate was heated on a steam bath with stirring, allowing the ethanol formed by the reaction to distill off. After 10 minutes the clear liquid reaction mixture crystallized to form a semi-solid cake. Heating was continued for an additional ten minutes and the reaction mixture then cooled. The solid was collected and recrystallized from absolute ethanol using decolorizing charcoal to yield 14.7 g. (56 percent) of isopropylidene 3-methyl-2-pyridylaminomethylenemalonate, m.p. 186.2°–186.8°C. (corr.) with decomposition.

Anal. Calcd. for $C_{13}H_{14}N_2O_4$: C, 59.53; H, 5.38; N, 10.68. Found: C, 59.75; H, 5.24; N, 10.61.

B. 9-Methyl-4H-pyrido[1,2-a]pyrimidin-4-one — A stirred suspension of 8.6 g. of isopropylidene 3-methyl-2-pyridylaminomethylenemalonate in 86 ml. of mineral oil was heated. At a temperature of 170°C. a clear red solution resulted. Bubbles of carbon dioxide began to form about three minutes later at 198°C. and continued for about four minutes after which time the temperature was 240°C. Heating was continued one minute longer (temperature of 250°C.), the heating source removed, the dark red solution cooled by rapid stirring and then cooled well in an ice bath. The resulting precipitate was collected and recrystallized from about 400 ml. of cyclohexane using decolorizing charcoal to yield 2.2. g. (42 percent) of 9-methyl-4H-pyrido[1,2-a]pyrimidin-4-one, m.p. 113.8°–114.8°C. (corr.).

Anal. Calcd. for $C_9H_8N_2O$: C, 67.49; H, 5.03; N, 17.49. Found: C, 67.71; H, 5.19; N, 17.35.

EXAMPLE 4

A. Isopropylidene 3-ethyl-6-methyl-2-pyridylaminomethylenemalonate — A mixture containing 8.6 g. of 3-ethyl-6-methyl-2-aminopyridine, 9.4 g. of triethyl orthoformate and 10.0 g. of isopropylidene malonate was stirred at room temperature; a little ethanol was added to facilitate stirring. The stirred mixture was heated on a steam bath and the ethanol (both that added and that formed by the reaction) was allowed to evaporate. The resulting clear solution was heated for an additional forty-five minutes whereupon the reaction mixture solidified. Heating was continued for an additional fifteen minutes and the reaction mixture then allowed to cool to room temperature. The solid was collected and recrystallized from absolute ethanol using decolorizing charcoal to yield 10.5 g. (57.5 percent) of isopropylidene 3-ethyl-6-methyl-2-pyridylaminomethylenemalonate, m.p. 162.0°–165.0°C.

Anal. Calcd. for $C_{15}H_{18}N_2O_4$: C, 62.05; H, 6.25; N, 9.65. Found: C, 61.97; H 6.22; N, 9.54.

B. 9-Ethyl-6-methyl-4H-pyrido[1,2-a]pyrimidin-4-one — To 80 ml. of Dowtherm A heated to reflux was added with stirring over a period of 1 minute 8.0 g. of isopropylidene 3-ethyl-6-methyl-2-pyridylaminomethylenemalonate. The reaction mixture was refluxed for an additional two minutes and then allowed to cool to room temperature with continued stirring. When no solid formed, the solution was diluted to 500 ml. with n-pentane and extracted three times with 50 ml. portions of 2.2N HCl. The combined extracts were washed once with ether and made basic with 10 percent aqueous potassium hydroxide solution. The alkaline solution was extracted three times with small portions of chloroform. The combined chloroform extracts were dried and decolorized by stirring for 10 minutes with solid anhydrous potassium carbonate and decolorizing charcoal, and then filtered. The chloroform was removed by heating on a steam bath to yield a brown oily residue which crystallized to a brown solid on standing overnight. The solid was recrystallized from 95 percent ethanol using decolorizing charcoal to yield 1.8 g. (35 percent) of pale yellow crystalline product, 9-ethyl-6-methyl-4H-pyrido[1,2-a]pyrimidin-4-one, m.p. 61.0°–62.0°C. (corr.).

Anal. Calcd. for $C_{11}H_{12}N_2O$: C, 70.18; H, 6.43; N, 14.88. Found: C, 70.22; H, 6.62; N, 14.73.

EXAMPLE 5

A. Isopropylidene 5-bromo-2-pyridylaminomethylenemalonate — To a mixture containing 17.3 g. of 2-amino-5-bromopyridine, 15.8 g. of isopropylidene malonate and 50 ml. of absolute ethanol was added with stirring 14.8 g. of triethyl orthoformate. The reaction mixture was warmed on a steam bath whereupon ethanol began to boil off and a solid began to form. After ten minutes, only a pale yellow solid cake remained. This was heated for an additional 15 minutes and then recrystallized from about 250 ml. of acetonitrile using decolorizing charcoal to yield 24.8 g. (76 percent) of the product, m.p. 192.0°–192.4°C. (corr.) with decomposition, after drying for 2 hours in a vacuum oven at 90°c.

Anal. Calcd. for $C_{12}H_{11}BrN_2O_4$: Br, 24.43; N, 8.57. Found: Br, 24.84; N, 8.36.

B. 7-Bromo-4H-pyrido[1,2-a]pyrimidin-4-one - To 100 ml. of Dowtherm A heated to reflux was added with stirring 10.0 g. of isopropylidene 5-bromo-2-pyridylaminomethylenemalonate whereupon a vigorous reaction ensued. The reaction mixture was refluxed for an additional three minutes and the dark solution was cooled to room temperature while stirring. When no solid separated, the solution was diluted with several volumes of n-pentane and the mixture extracted three times with 50 ml. portions of 2.2N HCl. The combined extracts were washed twice with ether, made basic with 180 ml. of 10 percent aqueous potassium hydroxide, cooled well in an ice bath, and the solid that separated was collected. The solid was recrystallized from 95 percent ethanol to yield 4.7 g. of 7-bromo-4H-pyrido[1,2-a]pyrimidin-4-one, m.p. 126.0°–127.0°C. (corr.).

Anal. Calcd. for $C_8H_5BrN_2O$: Br, 35.51; N, 12.45. Found: Br, 35.91; N, 12.41.

EXAMPLE 6

A. Isopropylidene 6-n-propyl-2-pyridylaminomethylenemalonate was prepared following the procedure described in Example 3A using 13.6 g. of 2-amino-6-n-propylpyridine, 14.8 g. of triethyl orthoformate and 15.8 g. of isopropylidene malonate. There was thus obtained 17.6 g. (61 percent) of the product, m.p. 151.0°–153.0°C. (corr.) after recrystallization from about 200–300 ml. of 95 percent ethanol using decolorizing charcoal.

Anal. Calcd. for $C_{15}H_{18}N_2O_4$: C, 62.05; H, 6.25; N, 9.65. Found: C, 62.20; H, 6.02; N, 9.94.

B. 6-n-Propyl-4H-pyrido[1,2-a]pyrimidin-4-one was prepared following the procedure described in Example 4B using 12.6 g. of isopropylidene 6-n-propyl-2-pyridylaminomethylenemalonate and 126 ml. of Dowtherm A. There was thus obtained 7.0 g. of the product, 6-n-propyl-4H-pyrido[1,2-a]pyrimidin-4-one, which was converted into its hydrochloride salt as follows: It was dissolved in dry ether and the ether solution treated with 20 ml. of 4N HCl. The resulting gummy precipitate was collected and triturated several times with fresh ether to yield a solid which was recrystallized from isopropyl alcohol containing a small amount of ether to yield 4.9 g. of 6-n-propyl-4H-pyrido[1,2-a]pyrimidin-4-one hydrochloride, m.p. 176°–178°C.

EXAMPLE 7

A. Isopropylidene 4,6-dimethyl-2-pyridylaminomethylenemalonate was prepared following the procedure described in Example 5A using 12.2 g. of 2-amino-4,6-dimethylpyridine, 14.8 g. of triethyl orthoformate, 15.8 g. of isopropylidene malonate and 25 ml. of absolute ethanol. There was thus obtained 17.4 g. (63 percent) of the product, m.p. 181.0°–182.0°C. (corr.) after recrystallization from 95 percent ethanol using decolorizing charcoal.

Anal. Calcd. for $C_{14}H_{16}N_2O_4$: C, 60.86; H, 6.84; N, 10.14. Found: C, 60.95; H, 6.00; N, 10.03.

B. 6,8-Dimethyl-4H-pyrido[1,2-a]pyrimidin-4-one was prepared following the procedure described in Example 3B using 12.2 g. of isopropylidene 4,6-dimethyl-2-pyridylaminomethylenemalonate and 122 ml. of Dowtherm A. There was thus obtained 4.0 g. of the product, m.p. 103.4°–104.6°C. (corr.) after recrystallization from about 200 ml. of cyclohexane using decolorizing charcoal. The structure of this compound was confirmed by nuclear magnetic resonance analysis.

Anal. Calcd. for $C_{10}H_{10}N_2O$: C, 68.95; H, 5.79; N, 16.08. Found: C, 68.82; H, 5.84; N, 16.30.

EXAMPLE 8

A. Isopropylidene 2,3-dimethyl-6-pyridylaminomethylenemalonate was prepared following the procedure described in Example 5A using 12.2 g. of 2-amino-5,6-dimethylpyridine, 14.8 g. of triethyl orthoformate, 15.8 g. of isopropylidene malonate and 15 ml. of absolute ethanol. There was thus obtained 18.2 g. (66 percent) of the product, m.p. 217°–218°C. (corr.) with decomposition after recrystallization from about 700 ml. of acetonitrile using decolorizing charcoal.

Anal. Calcd. for $C_{14}H_{16}N_2O_4$: C, 60.86; H, 5.84; N, 10.14. Found: C, 60.73; H, 5.93; N, 10.21.

B. 6,7-Dimethyl-4H-pyrido[1,2-a]pyrimidin-4-one was prepared following the procedure described in Example 3B using 13.2 g. of isopropylidene 5,6-dimethyl-2-pyridylaminomethylenemalonate and 132 ml. of Dowtherm A. There was thus obtained 3.9 g. (47 percent) of the product, m.p. 116.8°–118.6°C. (corr.), after recrystallization from cyclohexane using decolorizing charcoal.

Anal. Calcd. for $C_{10}H_{10}N_2O$: C, 68.95; H, 5.79; N, 16.08. Found: C, 68.74; H, 5.95; N, 16.37.

C. 1,6,7-Trimethyl-4-oxo-4H-pyrido[1,2-a]-pyrimidinium methyl sulfate — To a solution containing 17.4 g. of 6,7-dimethyl-4H-pyrido[1,2-a]pyrimidin-4-one dissolved in 100 ml. of warm acetonitrile was added 12.6 g. of dimethyl sulfate, the resulting reaction mixture was sitrred and refluxed on a steam bath for 2½ hours. After the reaction mixture had stood overnight at room temperature, it was stirred with some decolorizing charcoal and filtered. The filtrate was evaporated to dryness on a steam bath under reduced pressure and the resulting syrupy residue was cooled to room temperature whereupon it crystallized. The crystalline material was recrystallized twice from isopropyl alcohol and once from isopropyl alcohol containing a small quantity of ethanol to yield 3.0 g. of 1,6,7-trimethyl-4-oxo-4H-pyrido[1,2-a]pyrimidinium methyl sulfate, m.p. 168.0°–170.6°C. (corr.) with decomposition.

Anal. Calcd. for $C_{12}H_{16}N_2O_5S$: N, 9.33; S, 10.67. Found: N, 9.55; S, 11.04.

1,6,7-Trimethyl-4-oxo-4H-pyrido[1,2-a]-pyrimidinium methyl sulfate when administered orally at a dose level of 200 mg./kg. by the standard procedure of inhibiting carrageenin-induced local foot edema in rats was found to have anti-inflammatory activity.

EXAMPLE 9

A. Isopropylidene 6-acetylamino-2-pyridylaminomethylenemalonate was prepared following the procedure described in Example 5A using 30.2 g. of 2-amino-6-acetylaminopyridine, 29.6 g. of triethyl orthoformate, 31.7 g. of isopropylidene malonate and 100 ml. of absolute ethanol. There was thus obtained 47.9 g. (79 percent) of the product, m.p. 226.0°–226.5°C. (corr.) with decomposition after recrystallization from about 2500 ml. of 95 percent ethanol.

Anal. Calcd. for $C_{14}H_{15}N_3O_5$: C, 55.08; H, 4.95; N, 13.77. Found: C, 54.94; H, 5.12; N, 13.86.

B. A mixture of 6-acetylamino-4H-pyrido[1,2-a]-pyrimidin-4-one and 7-acetylamino-4-hydroxy-1,8-naphthyridine was prepared from the product of Example 9A as follows: To 380 ml. of Dowtherm A heated to reflux was added with stirring 38.0 g. of isopropylidene 6-acetylamino-2-pyridylaminomethylenemalonate over a period of about two minutes. The reaction mixture was refluxed for an additional 3 minutes and then cooled to room temperature with stirring. The solid that separated was collected, washed well with n-pentane and air-dried to yield 10.2 g. of 7-acetylamino-4-hydroxy-1,8-naphthyridine, m.p. 304°–308°C. with decomposition. The filtrate was diluted with a large volume of n-pentane and the resulting yellow solid was collected, washed well with n-pentane and dried to yield 10.2 g. of 6-acetylamino-4H-pyrido[1,2-a]pyrimidin-4-one, m.p. 158°–163°C. A second crop of 2.1 g. of the latter product was obtained from the mother liquor on standing. 6-Acetylamino-4H-pyrido[1,2-a]pyrimidin-4-one was recrystallized from absolute ethanol using decolorizing charcoal to yield 8.3 g. of the purified product, m.p. 162.6°–164.0°C. (corr.).

Anal. Calcd. for $C_{10}H_9N_3O_2$: C, 59.10; H, 4.46; N, 20.68. Found: C, 59.15; H, 4.20; N, 20.38.

7-Acetylamino-4-hydroxy-1,8-naphthyridine was recrystallized from water using decolorizing charcoal to yield 5.6 g. of the purified product, m.p. 319°–320°C.

Anal. Calcd. for $C_{10}H_9N_3O_2$: C, 59.10; H, 4.46; N, 20.68. Found: C, 59.21; H, 4.58; N, 20.86.

7-Acetylamino-4-hydroxy-1,8-naphthyridine has been prepared by a different method by Adams, J. Am. Chem. Soc. 68, 1317 (1946).

EXAMPLE 10

A. Isopropylidene 6-benzyl-2-pyridylaminomethylenemalonate was prepared following the procedure described in Example 5A using 18.2 g. of 2-amino-6-benzylpyridine, 14.8 g. of triethyl orthoformate, 15.8 g. of isopropylidene malonate and 25 ml. of absolute ethanol. There was thus obtained 13.7 g. of the product, m.p. 150.0°–153.0°C. (corr.) after one recrystallization from absolute ethanol using decolorizing charcoal and a second recrystallization from 95 percent ethanol.

Anal. Calcd. for $C_{19}H_{18}N_2O_4$: C, 67.44; H, 5.36; N, 8.28. Found: C, 67.69; H, 5.51; N, 8.33.

B. 6-Benzyl-4H-pyrido[1,2-a]pyrimidin-4-one was prepared following the procedure described in Example 3B using 9.0 g. of isopropylidene 6-benzyl-2-pyridylaminomethylenemalonate and 90 ml. of Dowtherm A. There was thus obtained 3.9 g. of the product, m.p. 110.0°–112.0°C. (corr.) when recrystallized from a very small amount of 95 percent ethanol using decolorizing charcoal.

Anal. Calcd. for $C_{15}H_{12}N_2O$: C, 76.25; H, 5.12; N, 11.86. Found: C, 76.19; H, 5.35; N, 11.81.

EXAMPLE 11

A. Isopropylidene 4-n-hexyl-2-pyridylaminomethylenemalonate was prepared following the procedure described in Example 1A using 3.6 g. of 2-amino-4-n-hexylpyridine, 3.0 g. of triethyl orthoformate, 3.2 g. of isopropylidene malonate, and a heating period of one hour. After recrystallization from 95 percent ethanol using decolorizing charcoal, there was obtained 4.3 g. (65 percent) of the product, m.p. 102°–103°C.

Anal. Calcd. for $C_{18}H_{24}N_2O_4$: C, 65.04; H, 7.28; N, 8.43. Found: C, 64.85; H, 7.17; N, 8.22

B. 8-n-Hexyl-4H-pyrido[1,2-a]pyrimidin-4-one was prepared following the procedure described in Example 3B using 4.0 g. of isopropylidene 4-n-hexyl-2-pyridylaminomethylenemalonate and 40 ml. of Dowtherm A. After recrystallization from about 10 ml. of cyclohexane using decolorizing charcoal, there was obtained 2.1 g. (76 percent) of the product, m.p. 80.0°–81.0°C. (corr.).

Anal. Calcd. for $C_{14}H_{18}N_2O$: C, 73.01; H, 7.88; N, 12.17. Found: C, 73.02; H, 7.56; N, 12.06.

EXAMPLE 12

A. Isopropylidene 3,4-dimethyl-2-pyridylaminomethylenemalonate was prepared following the procedure described in Example 1A using 1.6 g. of 2-amino-3,4-dimethylpyridine, 2.0 g. of triethyl orthoformate, 2.0 g. of isopropylidene malonate, and a heating period of one hour. After recrystallization from about 25 ml. of absolute ethanol using decolorizing charcoal, there was obtained 2.3 g. (64 percent) of product, m.p. 165°–167°C.

Anal. Calcd. for $C_{14}H_{16}N_2O_4$: C, 60.86; H, 5.84; N, 10.14. Found: C, 60.74; H, 5.53; N, 10.13.

B. 8,9-Dimethyl-4H-pyrido[1,2-a]pyrimidin-4-one was prepared following the procedure described in Example 3B using 1.7 g. of isopropylidene 3,4-dimethyl-2-pyridylaminomethylenemalonate and 17 ml. of Dowtherm A. After recrystallization from absolute ethanol, there was obtained 0.65 g. of product, m.p. 169.6°–171.6°C. (corr.).

Anal. Calcd. for $C_{10}H_{10}N_2O$: C, 68.95; H, 5.79; N, 16.08. Found: C, 68.64; H, 5.88; N, 16.02.

EXAMPLE 13

A. Isopropylidene 5-methyl-2-pyridylaminomethylenemalonate was prepared following the procedure described in Example 5A using 25.8 g. of 2-amino-5-methylpyridine, 35.6 g. of triethyl orthoformate, 38.0 g. of isopropylidene malonate and 45 ml. of absolute ethanol. After recrystallization from acetonitrile using decolorizing charcoal, there was obtained 41.3 g. (66 percent) of the product, m.p. 181°–183°C. A 6 g. sample was recrystallized a second time from acetonitrile to yield 4.6 g. of the product, m.p. 182.4°–184.0°C. (corr.).

Anal. Calcd. for $C_{13}H_{14}N_2O_4$: C, 59.53; H, 5.38; N, 10.68. Found: C, 59.35; H, 5.57; N, 10.76.

B. 7-Methyl-4H-pyrido[1,2-a]pyrimidin-4-one was prepared following the procedure described in Example 4B using 35.4 g. of isopropylidene 5-methyl-2-pyridylaminomethylenemalonate and 354 ml. of Dowtherm A. After three recrystallizations from cyclohexane, there was obtained 9.1 g. of the product, m.p. 78.8°–82.8°C. (corr.).

Anal. Calcd. for $C_9H_8N_2O$: C, 67.49; H, 5.03; N, 17.49. Found: C, 67.40; H, 5.28; N, 17.25.

EXAMPLE 14

A. Isopropylidene 6-hydroxy-2-pyridylaminomethylenemalonate was prepared following the procedure described in Example 5A using 11.0 g. of 2-amino-6-hydroxypyridine, 14.8 g. of triethyl orthoformate, 15.8 g. of isopropylidene malonate, 25 ml. of absolute ethanol, and a heating period of two hours. After recrystallization from about 700 ml. of absolute ethanol using decolorizing charcoal, there was obtained 15.1 g. (57 percent) of the product, m.p. 210.5°–211.0°C. (corr.) with decomposition.

Anal. Calcd. for $C_{12}H_{12}N_2O_5$: C, 54.54; H, 4.58; N, 10.60. Found: C, 54.31; H, 4.77; N, 10.46.

B. 6-Hydroxy-4H-pyrido[1,2-a]pyrimidin-4-one was prepared following the procedure described in Example 9B using 6.9 g. of isopropylidene 6-hydroxy-2-pyridylaminomethylenemalonate and 69 ml. of Dowtherm A. After recrystallization from dimethylformamide using decolorizing charcoal, there was obtained 2.7 g. of the product, m.p. 288.0°°–289.2°C. (corr.). Nuclear magnetic resonance spectral data showed the product to be a pyrido[1,2-a]pyrimidine rather than a 1,8-naphthyridine.

Anal. Calcd. for $C_8H_6N_2O_2$: C, 59.26; H, 3.73; N, 17.28. Found: C, 58.96; H, 4.04; N, 17.46.

EXAMPLE 15

A. Isopropylidene 2-quinolylaminomethylenemalonate — A mixture containing 19.5 g. of 2-amino-quinoline, 20.0 g. of triethyl orthoformate, 21.4 g. of isopropylidene malonate and 25 ml. of absolute ethanol was heated with stirring on a steam bath, allowing the ethanol to distill off. After about 25 minutes the mixture became too viscous to be stirred. Heating was continued for an additional 10 minutes and the reaction mixture was then cooled. The resulting solid was recrystallized twice from acetonitrile, the first time using decolorizing charcoal, to yield 14.2 g. of isopropylidene 2-quinolylaminomethylenemalonate, m.p. 224.0°–226.5°C. (corr.) with decomposition.

Anal. Calcd. for $C_{16}H_{14}N_2O_4$: C, 64.42; H, 4.73; N, 9.39. Found: C, 64.33; H, 4.61; N, 9.49.

B. 1H-Pyrimido-[1,2-a]quinolin-1-one — To 100 ml. of Dowtherm A heated to reflux was added with stirring over a period of about 1 minute 10.0 g. of isopropylidene 2-quinolylaminomethylenemalonate and heating was continued for another 4 minutes. The reaction mixture was allowed to cool to room temperature and, when no solid separated, was diluted with three volumes of n-pentane and extracted three times with 100 ml. portions of 2.2N HCl. In addition to a dissolved material, the aqueous layer contained a suspended solid which was filtered off. The filtrate was washed with ether, made basic with 10 percent aqueous potassium hydroxide solution and extracted with chloroform. The chloroform extract was dried over anhydrous potassium carbonate and evaporated on a steam bath to yield a residue which crystallized on cooling. This solid was recrystallized from 95 percent ethanol using decolorizing charcoal to yield 3.4 g. of 1H-pyrimido[1,2-a]quinolin-1-one, m.p. 112.5°–114.8°C. (corr.).

Anal. Calcd. for $C_{12}H_8N_2O$: C, 73.46; H, 4.11; N, 14.28. Found: C, 73.14; H, 4.05; N, 14.25.

1H-Pyrimido[1,2-a]quinolin-1-one when administered orally at a dose level of 200 mg./kg. by the standard procedure of inhibiting carrageenin-induced local foot edema in rats was found to have anti-inflammatory activity.

EXAMPLE 16

Isopropylidene 6-methyl-1-oxo-2-pyridylaminomethylenemalonate was prepared as follows: A mixture containing 15 g. of 2-amino-6-methylpyridine-N-oxide, 14.8 g. of triethyl orthoformate, 15.8 g. of isopropylidene malonate and 0.5 g. of p-toluenesulfonic acid hydrate was warmed on a steam bath for about five minutes and was then heated in vacuo on the steam bath for an additional five minutes to remove the ethanol formed by the reaction. The resulting solidified reaction mixture was triturated with isopropyl alcohol on the steam bath for a few minutes, cooled and filtered. The solid was recrystallized from ethanol using decolorizing charcoal to yield 10 g. (32 percent) of the product, m.p. 222.0°–222.8°C. (corr.) with decomposition.

Anal. Calcd. for $C_{13}H_{14}N_2O_5$: C, 56.11; H, 5.02; N, 10.07. Found: C, 56.15; H, 5.29; N, 10.09.

The above intermediate 2-amino-6-methylpyridine-N-oxide was prepared as follows: To 216 g. of 2-amino-6-methylpyridine was added 250 ml. of acetic anhydride, the mixture allowed to stand for fifteen minutes, and then evaporated on a rotary evaporator on a steam bath. To the resulting material containing 2-acetylamino-6-methylpyridine was added 280 ml. of 40 percent peracetic acid and 280 ml. of acetic acid. The resulting mixture was stirred for 1 hour at a temperature between 30° and 35°C. and then heated in an oil bath at 70°C. overnight. The mixture was then evaporated on a rotary evaporator on a steam bath. The remaining material was taken up in ethylene dichloride; the solution was washed with water and then twice with 5 percent aqueous potassium carbonate solution, dried over anhydrous potassium carbonate, and evaporated by heating in vacuo; and the resulting material was recrystallized from isopropyl alcohol and washed with n-pentane to yield 156 g. of 2-acetylamino-6-methylpyridine-N-oxide, m.p. 130°–132°C. [Anal. Calcd. for $C_8H_{10}N_2O_2$: C, 57.82; H, 6.07; N, 16.86. Found: C, 57.82; H, 6.06; N, 16.76]. A mixture containing 83 g. of 2-acetylamino-6-methylpyridine-N-oxide and 500 ml. of 15 percent aqueous potassium hydroxide solution was refluxed for three hours and then allowed to cool to room temperature. Concentrated hydrochloric acid was added to neutrality; the resulting clear solution was cooled and extracted with chloroform; and the chloroform solution evaporated to yield 15 g. of 2-amino-6-methylpyridine-N-oxide.

EXAMPLE 17

A. Isopropylidene 6-methyl-3-nitro-2-pyridylaminomethylenemalonate was prepared following the procedure described in Example 5A using 12.7 g. of 2-amino-6-methyl-3-nitropyridine, 12.3 g. of triethyl orthoformate, 13.1 g. of isopropylidene malonate and 150 ml. of absolute ethanol. After recrystallization from absolute ethanol using decolorizing charcoal, there was obtained 12.4 g. (49 percent) of product, m.p. 182°–183°C. A 5 g. portion of the product was recrystallized a second time from absolute ethanol using decolorizing charcoal to yield 4.5 g. of product, m.p. 177.2°–179.8°C. (corr.).

Anal. Calcd. for $C_{13}H_{13}N_3O_6$: C, 50.81; H, 4.26; N, 13.68. Found: C, 50.98; H, 4.29; N, 13.65.

B. Heating a sample of isopropylidene 6-methyl-3-nitro-2-pyridylaminomethylenemalonate in Dowtherm A following the procedure described in Example 5B yields 6-methyl-9-nitro-4H-pyrido[1,2-a]pyrimidin-4-one.

EXAMPLE 18

A. Isopropylidene 6-methyl-5-nitro-2-pyridylaminomethylenemalonate was prepared following the procedure described in Example 5A using 26.8 g. of 2-amino-6-methyl-5-nitropyridine, 25.9 g. of triethyl orthoformate, 27.8 g. of isopropylidene malonate and 300 ml. of absolute ethanol. After recrystallizing from about 800 ml. of acetonitrile using decolorizing charcoal, there was obtained 34.7 g. (65 percent) of the product, m.p. 220.0°–221.0°C. (corr.) with decomposition.

Anal. Calcd. for $C_{13}H_{13}N_3O_6$: C, 50.81; H, 4.26; N, 13.68. Found: C, 50.77; H, 4.35; N, 13.67.

B. Heating a sample of isopropylidene 6-methyl-5-nitro-2-pyridylaminomethylenemalonate in Dowtherm A following the procedure described in Example 5B yields 6-methyl-7-nitro-4H-pyrido[1,2-a]pyrimidin-4-one.

The following compounds are obtained by following the two-step procedure described in Examples 1A and 1B, using in the first step (like 1A) corresponding molar equivalent quantities of the appropriate 2-aminopyridine, triethyl orthoformate and isopropylidene malonate and heating in the second step (like 1B) the resulting isopropylidene 2-pyridylaminomethylenemalonate in mineral oil to form the corresponding 4H-pyrido[1,2-a]-pyrimidin-4-one: isopropylidene 4-methoxy-2-pyridylaminomethylenemalonate (from 2-amino-4-methoxypyridine) and 8-methoxy-4H-pyrido[1,2-a]pyrimidin-4-one; isopropylidene 5-n-butoxy-2- pyridylaminomethylenemalonate (from 2-amino-5-n-butoxypyridine) and 7-n-butoxy-4H-pyrido[1,2-a]pyrimidin-4-one; isopropylidene 4-isopropyl-2-pyridylaminomethylenemalonate (from 2-amino-4-isopropylpyridine) and 8-isopropyl-4H-pyrido[1,2-a]pyrimidin-4-one; isopropylidene 6-propionylamino-2-pyridylaminomethylenemalonate (from 2-amino-6-propionylaminopyridine) and 6-propionylamino-4H-pyrido[1,2-a]pyrimidin-4-one; isopropylidene 4-hydroxy-2-pyridylaminomethylenemalonate (from 2-amino-4-hydroxypyridine) and 8-hydroxy-4H-pyrido[1,2-a]pyrimidin-4-one; isopropylidene 4-benzyl-2-pyridylaminomethylenemalonate (from 2-amino-4-benzylpyridine) and 8-benzyl-4H-pyrido[1,2-a]pyrimidin-4-one; isopropylidene 3,6-diethyl-2-pyridylaminomethylenemalonate (from 2-amino-3,6-diethylpyridine) and 6,9-diethyl-4H-pyrido[1,2-a]pyrimidin-4-one; isopropylidene 4,6-diethyl-2-pyridylaminomethylenemalonate (from 2-amino-4,6-diethylpyridine) and 6,8-diethyl-4H-pyrido-[1,2-a]pyrimidin-4-one; isopropylidene 4-methylmercapto-2-pyridylaminomethylenemalonate (from 2-amino-6-methylmercaptopyridine) and 6-methylmercapto-4H-pyrido[1,2-a]-pyrimidin-4-one; isopropylidene 4-methylsulfinyl 2-pyridylaminomethylenemalonate (from 2-amino-4-methylsulfinylpyridine) and 8-methylsulfinyl-4H-pyrido[1,2-a]-pyrimidin-4-one; isopropylidene 6-n-butylsulfonyl-2-pyridylaminomethylenemalonate (from 2-amino-6-n-butylsulfonylpyridine) and 6-n-butylsulfonyl-4H-pyrido[1,2-a]-pyrimidin-4-one; isopropylidene 6-n-butylamino-2-pyridylaminomethylenemalonate (from 2-amino-6-n-butylaminopyridine) and 6-n-butylamino-4H-pyrido[1,2-a]pyrimidin-4-one; isopropylidene 5-trifluoromethyl-2-pyridylaminomethylenemalonate (from 2-amino-5-trifluoromethylpyridine) and 7-trifluoromethyl-4H-pyrido[1,2-a]-pyrimidin-4-one; isopropylidene 3,4,5-trimethyl-2-pyridylaminomethylenemalonate (from 2-amino-3,4,5-trimethylpyridine) and 7,8,9-trimethyl-4H-pyrido[1,2-a]-pyrimidin-4-one; isopropylidene 6-amino-2-pyridylaminomethylenemalonate (from 2,6-diaminopyridine) and 6-amino-4H-pyrido[1,2-a]pyrimidin-4-one; isopropylidene 4-methyl-2-pyridylaminomethylenemalonate, m.p. 191°–192.5°C. (dec.), (from 2-amino-4-methylpyridine) and 8-methyl-4H-pyrido[1,2-a]pyrimidin-4-one.

Following the two-step procedure described in Examples 15A and 15B using a molar equivalent quantity of the appropriate aminoquinoline in place of 2-aminoquinoline in the first step, the following compounds are prepared: isopropylidene 4-ethoxy-2-quinolylaminomethylenemalonate (using 2-amino-4-ethoxyquinoline) and 6-ethoxy-1H-pyrimido[1,2-a]quinolin-1-one; isopropylidene 4-trifluoromethyl-2-quinolylaminomethylenemalonate (using 2-amino-4-trifluoromethylquinoline) and 6-trifluoromethyl-1H-pyrimido[1,2-a]quinolin-1-one; isopropylidene 4,7-dichloro-2-quinolylaminomethylenemalonate (using 2-amino-4,7-dichloroquinoline) and 6,9-dichloro-1H-pyrimido[1,2-a]quinolin-1-one; and, isopropylidene 3-methyl-2-quinolylaminomethylenemalonate (using 2-amino-3-methylquinoline) and 5-methyl-1H-pyrimido[1,2-a]quinolin-1-one.

The anti-inflammatory activity of the (4-oxo-6-$R_3$-2,3-pyrimido)-Ar products of my process is measured by the inhibition of carrageenin-induced local foot edema in fasted rats generally according to the procedure of C. A. Winter et al., Proc. Soc. Exptl. & Med. 111, 544–547 (1962) as follows: Food is withdrawn from male albino rats weighing approximately 110–124 gms., eighteen hours prior to a single oral medication of the test compound. Each compound is administered to at least five rats. One hour following the medication, 0.05 ml. of 1 percent aqueous suspension of carrageenin is injected into the plantar tissue of the right hind foot. Three hours after injections, the rats are sacrificed and the hind feet cut off at the tibio-calcaneo-talar joint for subsequent weighing. The observed difference between the average edema weight of the control and medicated rats is expressed as per cent inhibition of edema. When tested by the above-described procedure, the (4-oxo-6-$R_3$-2,3-pyrimido)-Ar products are found to inhibit local edema due to carrageenin-induced inflammation when administered at oral dose levels between about 10 and 200 mg./kg.

The actual determination of the numerical biological data definitive for a particular compound is readily obtained by standard test procedures, referred to above, by technicians versed in pharmacological test procedures, without any need for any extensive experimentation.

The (4-oxo-6-$R_3$-2,3-pyrimido)-Ar products can be prepared for use by conventional pharmaceutical procedures: that is, by dissolving or suspending them in a pharmaceutical acceptable vehicle, e.g., aqueous alcohol, glycol, oil solution, or oil-water emulsion, for parenteral or oral administration; by incorporating them in unit dosage form as tablets or capsules for oral administration either alone or in combination with conventional adjuvants, e.g., calcium carbonate, starch, lactose, talc, magnesium stearate, gum acacia, and the like.

I claim:
1. The process which consists of heating a compound of the formula

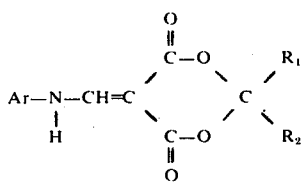

where $R_1$ and $R_2$ are each lower-alkyl, and Ar is 2-pyridyl substituted at available ring carbon positions by from one to three lower-alkyl substituents or a single substituent selected from the group consisting of lower-alkoxy, lower-alkylmercapto, lower-alkylsulfinyl, lower-alkylsulfonyl, trihalomethyl, lower-alkylamino, lower-alkanoylamino, hydroxy and benzyl, where lower-alkyl in each instance has from one to six carbon atoms, to form a 4H-pyrido[1,2-a]pyrimidin-4-one of the formula

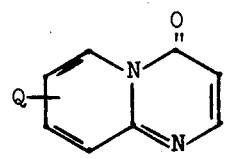

where Q represents from one to three lower-alkyl substituents or a single substituent at positions selected from 6, 7, 8 and 9 of the pyridopyrimidine nucleus, said single substituent selected from those given above as substituents of 2-pyridyl.

2. The process according to claim 1 which consists of heating isopropylidene Ar-aminomethylenemalonate to form Q-4H-pyrido[1,2-a]pyrimidin-4-one where Ar and Q have the meanings given in Claim 1 and each of $R_1$ and $R_2$ is methyl.

3. The process which consists of heating isopropylidene 2-quinolylaminomethylenemalonate to form 1H-pyrimido[1,2-a]quinolin-1-one.

* * * * *

UNITED STATES PATENT AND TRADEMARK OFFICE
CERTIFICATE OF CORRECTION

PATENT NO. : 3,907,798
DATED : September 23, 1975
INVENTOR(S) : George Y. Lesher It is certified that error appears in the above-identified patent and that said Letters Patent are hereby corrected as shown below:

Column 1, line 2, "·1,2-A/" should read -- [1,2-A] --.

Column 3, line 16, "the step" should read -- in step --.

Column 3, lines 26 thru 32, formula IX should read

-- 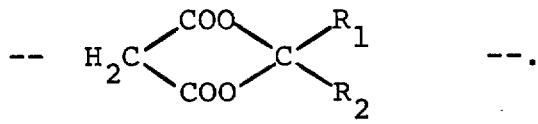 --.

Column 3, lines 34 thru 44, formula Ia should read

-- 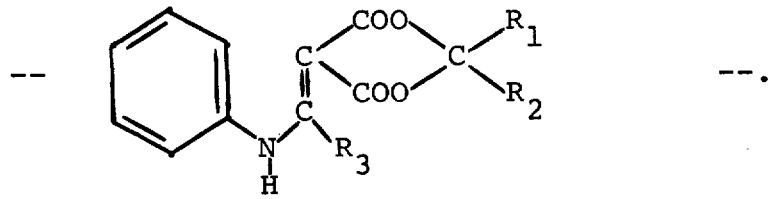 --.

Column 5, lines 13 thru 21, formula Xa should read

-- 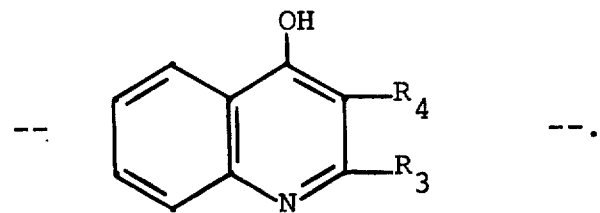 --.

Column 9, line 16, 'A"-Z' should read -- Ar"-Z --.

Signed and Sealed this

Twenty-first Day of September 1976

[SEAL]

Attest:

RUTH C. MASON
Attesting Officer

C. MARSHALL DANN
Commissioner of Patents and Trademarks